United States Patent [19]

Messerschmidt, Jr. et al.

[11] 4,125,661

[45] Nov. 14, 1978

[54] LAMINATED PLATES FOR CHEMICAL MILLING

[75] Inventors: Harold J. Messerschmidt, Jr., Stockholm; Karl Heyman, Montclair, both of N.J.

[73] Assignee: Mona Industries, Inc., Paterson, N.J.

[21] Appl. No.: 857,350

[22] Filed: Dec. 2, 1977

Related U.S. Application Data

[63] Continuation of Ser. No. 668,568, Mar. 19, 1976, abandoned.

[51] Int. Cl.$^2$ .................. B41N 1/00; B32B 15/08; B32B 27/38; G03C 1/94
[52] U.S. Cl. ................... 428/201; 96/36.3; 96/86 R; 101/456; 101/458; 156/330; 156/332; 156/334; 156/656; 156/659; 428/209; 428/213; 428/215; 428/908
[58] Field of Search ............... 428/201, 209, 213, 215, 428/416, 458, 462, 908, 216; 427/388; 156/330, 332, 334, 656, 658, 659, 630, 634, 655, 905; 96/36.3, 86 R, 86 P; 101/453, 456, 457, 458, 459

[56] References Cited

U.S. PATENT DOCUMENTS

| | | | |
|---|---|---|---|
| 2,999,016 | 9/1961 | Beeber et al. | 96/92 X |
| 3,100,760 | 8/1963 | Brown et al. | 156/332 X |
| 3,201,239 | 8/1965 | Neugebauer et al. | 96/33 X |
| 3,222,175 | 12/1965 | Rasch | 156/905 X |
| 3,305,416 | 2/1967 | Kahan et al. | 156/630 |
| 3,448,516 | 6/1969 | Buck | 156/630 X |
| 3,607,474 | 9/1971 | Hensdale | 156/630 |
| 3,660,088 | 5/1972 | Lundsager | 96/36.3 X |
| 3,765,894 | 10/1973 | Mellan | 96/49 X |
| 3,816,273 | 6/1974 | Snyder | 156/659 X |
| 3,960,622 | 6/1976 | Höfling | 156/656 X |

*Primary Examiner*—William A. Powell
*Assistant Examiner*—Thomas Bokan
*Attorney, Agent, or Firm*—Sprung, Felfe, Horn, Lynch & Kramer

[57] ABSTRACT

Metal plates, e.g., of magnesium, zinc or copper, suitable for chemical milling and etching operations to produce photoengraving plates, printed circuit boards, nameplates, etc., comprising a metal layer and, adhered thereto, a plastic film layer having a thickness substantially smaller than that of the metal layer. The resulting composite laminates have proved outstandingly useful in permitting the employment of thinner metal layers, thus resulting in lighter weight and less expensive plates, yet retaining the required resistance to the chemical milling or etching process without impairment of mechanical stability and other desirable properties of the plate.

11 Claims, No Drawings

LAMINATED PLATES FOR CHEMICAL MILLING

This is a continuation application of Ser. No. 668,568, filed Mar. 19, 1976, now abandoned.

This invention relates to composite plates used in chemical milling. More particularly, the invention relates to composite plates comprising a metal layer and adhered thereto a substantially thinner plastic film layer which. These plates are useful in the field of photoengraving, printed circuits, nameplates and, generally, products obtained by chemical milling.

It is known to chemically dimension metal objects by the action of chemicals, e.g., strong acids, such as nitric acid, or strong alkalis thereon. The indiscriminate action of the etchant, such as nitric acid, can be controlled by adding to the acid etchant materials known as "filming agents" which control or direct the penetrating action of the etchant acid. Particularly useful filming agents have been developed in the field of photoengraving wherein various powderless etching techniques have been known for many years. Recent patents, viz., U.S. Pat. Nos. 3,725,158; 3,725,159; 3,728,180; 3,730,899; and 3,736,197 disclose especially advanced etching systems which permit the high speed etching of magnesium and zinc plates, particularly photoengraving plates, to form sharply defined relief patterns in one operation.

However, in the prior art practice of chemical milling or etching such as in the photoengraving field, the depth of the etch still needed to be carefully controlled, particularly on planar surfaces in that it is, of course, essential to retain a sufficiently thick contiguous metal layer forming the bottom of the plate in order to give the plate sufficient structural stability to be used in printing or to be used as matrixes to make the mats used in casting the ultimate printing plates. This in turn has required the use of relatively large amounts of metal to form not only the raised relief areas, but to maintain the entire plate "bottom" of sufficient strength and thickness.

To overcome the economic disadvantage of having to use relatively large amounts of the often costly photoengraving metals, it has been suggested in the art to laminate the zinc or magnesium engraving plates to relatively cheap and strong metals, such as aluminum or steel. This was accomplished by metallurgically bonding the zinc or magnesium to the base metal. However, the resulting plates were still relatively expensive and lacked etching uniformity since they were "rolled" after the metal-to-metal bonding, thereby distorting the crystal structure of the metal to be etched.

The present invention provides composite plates which require much less of the metal to be etched or milled than conventional plates, yet are not subject to the disadvantages of the metal-to-metal laminates that have been previously suggested. In addition, the composite plates provided by the present invention are sufficiently strong and stable to survive the etching process and retain enough mechanical rigidity to be used either as printing plates per se or as matrixes for casting printing plates.

The laminate compositions provided by the present invention comprise a metal layer of a millable metal adhered to a substantially thinner layer of a plastic film. Surprisingly we have found that, e.g., plates according to the invention can be made by use of 30 mil thick metal plates adhered to plastic films only 1 mil thick and that the resultant composites give the support needed for their ultimate purpose.

The ratio of the thickness of the metal plate to that of the adhered plastic film is typically about 30:1 but may range to values as low as 3:1 to values as high as 70:1. Thus, it is, for instance, possible to back a 30 mil magnesium photoengraving plate with a 1 mil polyester film to result in a composite which, after development and etching, is sufficiently stable to be used for mat making, i.e., as a matrix for making the mats from which the actual printing plates are then cast. Of course, it will be understood that the etched metal plate should retain a metal frame or border around the plate to give the entire etched composite sufficient dimensional stability.

The metals to which the present invention is applicable are millable or etchable metals, such as magnesium, zinc, and copper; magnesium/plastic film laminates have been found particularly outstanding in that they provide the inherent advantages of magnesium (lightness, quick etching action, and a high quality relief) with the added advantages of the present invention, i.e., the requirement for relatively very small amounts of metal. In addition, the instantly provided composite plates have the advantage that, during the etching process the etching depth need not be closely controlled, as in the case of etching conventional metal plates where care needed to be exercised to retain enough plate bottom for structural stability, in that etching of the instant composites can be carried out down to the plastic film layer which is relatively impervious to the action of the acid etchant and thus provides a uniform overall depth of the bottom of the etching surface.

The use of composite plates of the invention provides a further advantage in that the etched plate may contain isolated printing elements adhered to the plate only through the plastic film backing. In such instances, it is possible to remove such element if desired and replace same, provided, of course, that a non-hardening bonding agent or adhesive is used. Thus, use of self-adhesive, e.g., pressure-sensitive, "Mylar" has been found to permit removal of individual isolated printing elements from the etched plate. For this application a non-hardening bonding agent or adhesive may also be used. Thus, by use of this embodiment of the invention, a newspaper may, for instance, carry a weekly advertisement for certain merchandise with price quotations. Such a master plate may be used repeatedly and in case of price changes the numbers can easily be removed from the film backing and replaced with new ones which are fastened with adhesive. This embodiment of the invention is also useful as a means for correcting errors. Likewise, the original plate may have openings into which later deadline items can be inserted. The replacement printing areas or deadline items are produced on separate plates and can easily be removed from the supportive film and inserted into the master plate with adhesive.

This procedure lends itself also to the production of individual numbers or letters for signs, nameplates, etc. Base elements for custom jewelry in intricate design or parts for machines, instruments, etc., can easily be mass produced in magnesium, zinc, copper or other metal. If desired, the thickness of the metal can be substantially increased as required for deep etching. The film thickness must be such that the individual parts to be etched will not distort the film or break it on account of their weights, particularly when still in the etching machine.

The plastic films usable in the present invention are in general plastic films resistant to the action of the etching chemicals, e.g., strong acids such as nitric acid, and are preferably plastic films with substantial dimensional stability. We have found to be particularly useful polymeric film such as polyester films, e.g., "Mylar", manufactured by E. I. duPont de Nemours & Co., Wilmington, Del. Also useful are, e.g., dicellulose acetate and tricellulose acetate which also exhibit a fairly high degree of dimensional stability. Also employable are ABS, chlorotrifluoroethylene, ethylene and tetrafluoroethyl polymer, tetrafluoroethylene and hexafluoropropylene, polytetrafluoroethylene, polymethyl methacrylate, polycarbonate, polyester terephthalate, polystyrene, polysulfone, non plasticized vinyl chloride-acetate, vinylidene chloride-vinyl chloride, and non-plasticized vinyl chloride.

The plastic film can be either self-adhesive, e.g., pressure sensitive, as in the case of available "Mylar" products such as "CL LAM MYLAR" produced by the Fitchburg Coated Products Co., a division of Litton Industries, Scranton, Pa. which is provided with a pressure-sensitive adhesive layer. In this case, there is no separate adhesive needed to adhere the plastic film to the bottom of the metal plate and this is accomplished simply by pressing the film onto the plate. When using plastic films which have not already been made self-adhesive, it may be necessary to include an adhesive agent, such as the acrylic adhesives known in the art, e.g., acrylic polyester adhesives involving the use of isocyanate curing agents. Other suitable adhesives which are pressure-sensitive are polyisobutylene, polyvinyl ethyl ether, butadiene styrene copolymers, and other such products known to the art.

Also utilizable are curing or heat-setting adhesives such as Buna N-Thiokol (rubber base adhesives), acrylic, butadiene-acrylonitrile, coumarone-indene, epoxy, melamine-formaldehyde, phenolic, polyamides, alkyl 2-cyanoacrylates, polyurethane, polyvinyl acetate or ether, urea-formaldehyde, and carboxylic elastomers.

Typical curing agents or catalysts for use with the above-mentioned adhesives are phenylenediamine, tetraethylenepentamine, triethylenetetramine, hexamethylenetetramine, 2,6-diaminopyridine, and isocyanates.

The plastic film may be adhered to the bottom of the metal plate at any time prior to the actual etching operation. In the case of photoengraving plates, for instance, the film may be adhered to the bottom of the photoengraving metal plate before development of the surface of the metal plate, i.e., before exposure of the plate. Alternatively, the films may be adhered after development of the plate. When adhering the film to the metal plate prior to exposure, the plastic film or the adhesive used to adhere the plastic film to the metal plate must, of course, be such as to withstand the action of any chemicals, e.g., trichloroethylene, that may be used in the development process.

We have found that it is possible to provide composites that withstand the development chemicals by, e.g., utilizing "Mylar" or a plastic film adhered to the metal plate by use of an epoxy adhesive (e.g., the Wilhold Clear Epoxy compositions sold by the Wilhold Glues, Inc., company of Los Angeles, Calif.) adhesive or ethylene/ethyl acrylate adhesives which are impervious to the chemicals used in the development operation. These adhesives maintain close adhesion between plastic film and metal during such developing operation. This embodiment of the invention is, as will be readily recognized, particularly useful because it permits the plate manufacturer to adhere the plastic film and thus sell the composite plates of the present invention as articles of commerce, whereupon the ultimate user (etcher) can perform his developing and etching operations without change from prior used techniques.

If the film is adhered *after* development of the photoengraving plate, this can be easily accomplished by the photoengraver himself by hand or with standard laminating machines.

In the photoengraving field, the thickness of the metal to be etched is generally from 30 to 250 mils (thousandths of an inch) and the thickness of the plastic film adhered thereto is generally in the range of about ½ mil to about 10 mils, with thicknesses of 1 mil having been found useful, e.g., in photoengraving plates for mat making.

The following examples are illustrative of the invention (Example A is a comparative example not utilizing the composite laminates of the present invention):

EXAMPLE 1

A 0.030 inch precoated engraver's magnesium sheet was laminated by hand on its backside with an 0.001 inch thick self-adhesive "Mylar" film carrying an acrylic adhesive ("No. 545" acrylic adhesive supplied by the Fitchburg Coated Products Company of Scranton, Pa.). After UV exposure under a suitable negative, the plate was developed in trichloroethylene and etched using a powderless etching process with nitric acid and a filming agent ("Mag Etch MS" made by Mona Industries, Inc. of Paterson, N.J.). The plate was etched at 90° F. for 4 minutes to assure complete metal removal in the open areas to expose the back coating. After the plate was washed and dried, an inspection showed that all printing surfaces were well preserved, the support layer held all areas well in position. The etched plate had sufficient rigidity for further handling.

In particular, a newspaper size plate etched in the above fashion was used for mat making in the production of stereotypes. In this process manufactured pulp sheet is used for producing an intermediate matrix. This "mat" is molded by rolling the pulp sheet on top of the engraved metal plate under substantial pressure. The actual printing plate for the printing press is the prepared from this mat with hot type metal. Ten such mats were produced from the above-described magnesium plate backed with 0.001 inch thick "Mylar" film without any deterioration of the plate so that an additional number of mats could have been produced. The quality of the mats was excellent.

EXAMPLE A

A magnesium plate was etched exactly in the manner of Example 1 except that no support film was applied to the back of this plate. Printing areas which were not attached to the border metal of the plate had fallen into the etching machine, making the plate useless.

EXAMPLE 2

A sheet of aluminum foil was sprayed with a spray adhesive ("Liquitape") and allowed to dry. A sheet of 0.030 inch precoated magnesium was exposed and developed. "Liquitape" was then sprayed directly onto the back coating of this plate and also allowed to dry. Finally, both aluminum foil and magnesium plate were joined and the lamination secured under pressure. The plate was etched according to Example 1 so that the back coating became exposed in the open areas. The rigidity of the plate was sufficient for mat making.

EXAMPLE 3

A plate for mat making having a relief pattern including isolated areas, i.e., areas not joined by metal to the remainder of the plate, was prepared following the procedure of Example 1. Isolated printing areas could be removed from the etched plate for the purpose of replacement or elimination.

It will be understood that the specification and examples are illustrative but not limitative of the present invention and that other embodiments within the spirit and scope of the invention will suggest themselves to those skilled in the art. For instance, the plastic film may be replaced with thin sheets of metal impervious to the action of the chemical etchant, i.e., thin foils of aluminum or steel, which may be adhered to the photoengraving metal plate by means of an adhesive such as those disclosed above.

What is claimed is:

1. Composite photoengraving plate for printing comprising a layer of magnesium metal having a thickness of from 10 to 250 thousandths of an inch and a surface layer of a presensitized coating for exposing and developing a photoengraving image, and adhered to the bottom of said magnesium metal layer, by means of an adhesive layer impervious to development chemicals, a continuous plastic film having a thickness of from 1 to 5 thousandths of an inch, wherein the ratio of the magnesium metal thickness to the plastic film thickness is from 3:1 to 70:1.

2. Composite photoengraving plate for printing comprising a layer of magnesium metal having a thickness of from 10 to 250 thousandths of an inch and a surface layer of a pre-sensitized coating for exposing and developing a photoengraving image, and adhered to the bottom of said magnesium metal layer, by means of an adhesive layer impervious to trichloroethylene, a continuous plastic film having a thickness of from 1 to 5 thousandths of an inch, wherein the ratio of the magnesium metal thickness to the plastic film thickness is from 3:1 to 70:1.

3. Composite photoengraving plate as claimed in claim 2 wherein said adhesive is an acrylic polyester adhesive.

4. Composite photoengraving plate as claimed in claim 3 wherein said adhesive is a cured epoxy resin.

5. Composite photoengraving plate as claimed in claim 6 wherein said adhesive is an ethylene/ethyl acrylate copolymer.

6. Composite photoengraving plate as claimed in claim 2 wherein said metal plate is an exposed and developed photoengraving plate.

7. Composite photoengraving plate as claimed in claim 2 wherein the thickness of said plastic film is from 0.5 to 10 mils.

8. Composite photoengraving plate as claimed in claim 2 wherein the metal layer thickness is about 30 mils and the plastic film thickness is about 1 mil.

9. Composite photoengraving plate as claimed in claim 2 wherein said plastic film is a polyester film.

10. Composite photoengraving plate as claimed in claim 9 wherein said plastic film is polyethylene terephthalate film.

11. Composite plate as claimed in claim 2 wherein areas of said plate have been etched entirely through the metal.

* * * * *